United States Patent
Miratsu et al.

(10) Patent No.: US 9,612,366 B2
(45) Date of Patent: Apr. 4, 2017

(54) COMPOSITE TUNGSTEN OXIDE PARTICLE DISPERSION POLYCARBONATE RESIN COMPOSITION AND HEAT-RAY SHIELDING SINTERED COMPACT AND HEAT-RAY SHIELDING LAMINATE USING THE COMPOSITION

(71) Applicant: SUMITOMO METAL MINING CO., LTD., Tokyo (JP)

(72) Inventors: Mitsunobu Miratsu, Ichikawa (JP); Kenichi Fujita, Ichikawa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 171 days.

(21) Appl. No.: 14/380,538

(22) PCT Filed: Feb. 20, 2013

(86) PCT No.: PCT/JP2013/054135
§ 371 (c)(1),
(2) Date: Aug. 22, 2014

(87) PCT Pub. No.: WO2013/125563
PCT Pub. Date: Aug. 29, 2013

(65) Prior Publication Data
US 2015/0024211 A1    Jan. 22, 2015

(30) Foreign Application Priority Data
Feb. 22, 2012  (JP) ................................ 2012-035856

(51) Int. Cl.
| B32B 27/20 | (2006.01) |
| G02B 1/10 | (2015.01) |
| C08K 3/22 | (2006.01) |
| C08K 3/24 | (2006.01) |
| C08K 3/00 | (2006.01) |
| B32B 27/36 | (2006.01) |
| G02B 5/20 | (2006.01) |
| C08J 3/22 | (2006.01) |

(52) U.S. Cl.
CPC ............... *G02B 1/10* (2013.01); *B32B 27/20* (2013.01); *B32B 27/365* (2013.01); *C08J 3/226* (2013.01); *C08K 3/0075* (2013.01); *C08K 3/22* (2013.01); *C08K 3/24* (2013.01); *G02B 5/208* (2013.01); *B32B 2264/102* (2013.01); *B32B 2264/104* (2013.01); *B32B 2307/304* (2013.01); *B32B 2369/00* (2013.01); *C08J 2469/00* (2013.01); *C08K 2003/2258* (2013.01); *Y10T 428/31507* (2015.04)

(58) Field of Classification Search
None
See application file for complete search history.

(56) References Cited

U.S. PATENT DOCUMENTS

| 3,477,978 A * | 11/1969 | Kim .................... C08K 5/098 423/38 |
| 3,647,747 A * | 3/1972 | Bialous .................... C08K 3/26 524/424 |
| 3,742,085 A * | 6/1973 | Bialous .................... C08K 3/26 524/424 |
| 3,784,595 A * | 1/1974 | Schirmer .................. C08J 3/22 524/315 |
| 4,154,718 A * | 5/1979 | Miyata ..................... C08K 3/00 524/408 |
| 7,553,893 B2 * | 6/2009 | Kawato .................... C08K 5/50 524/109 |
| 8,168,711 B2 * | 5/2012 | Mamak ................... B29C 65/16 252/62 |
| 8,202,927 B2 * | 6/2012 | Hiwatashi .............. C09J 133/08 524/406 |
| 2003/0186040 A1 * | 10/2003 | Oya ........................... C08J 5/18 428/304.4 |
| 2006/0008640 A1 | 1/2006 | Chonan et al. |
| 2006/0178254 A1 * | 8/2006 | Takeda .................... C01G 41/00 501/1 |
| 2008/0116426 A1 * | 5/2008 | Adachi ............... B29C 65/1677 252/582 |
| 2009/0012222 A1 * | 1/2009 | Duijzings ............... C08L 69/00 524/405 |
| 2009/0140284 A1 * | 6/2009 | Kurino ................. C08G 83/001 257/100 |
| 2010/0144935 A1 | 6/2010 | Roth et al. |
| 2010/0220388 A1 * | 9/2010 | Suzuki ................... B32B 17/10 359/359 |
| 2013/0245147 A1 * | 9/2013 | Altmann ................ C09K 5/063 521/143 |

FOREIGN PATENT DOCUMENTS

| JP | A-61-277437 | 12/1986 |
| JP | A-02-173060 | 7/1990 |
| JP | A-05-078544 | 3/1993 |
| JP | A-06-256541 | 9/1994 |
| JP | A-06-264050 | 9/1994 |
| JP | A-10-146919 | 6/1998 |
| JP | A-10-298373 | 11/1998 |
| JP | A-10-298417 | 11/1998 |
| JP | A-2000-096034 | 4/2000 |

(Continued)

OTHER PUBLICATIONS

May 28, 2013 International Search Report issued in International Application No. PCT/JP2013/054135.

*Primary Examiner* — Robert S Loewe
(74) *Attorney, Agent, or Firm* — Oliff PLC

(57) ABSTRACT

There is provided a composite tungsten oxide particle dispersion polycarbonate resin composition containing composite tungsten oxide particles expressed by a general formula $M_xW_yO_z$, metal salt, and polycarbonate resin, wherein the metal salt is a salt of one or more kinds of metal elements selected from Mg, Ni, Zn, In, and Sn.

5 Claims, No Drawings

(56) References Cited

FOREIGN PATENT DOCUMENTS

| JP | A-2000-169765 | 6/2000 |
| JP | A-2001-179887 | 7/2001 |
| JP | A-2004-059875 | 2/2004 |
| JP | A-2008-024902 | 2/2008 |
| JP | A-2010-519270 | 6/2010 |
| JP | A-2011-012276 | 1/2011 |
| JP | A-2012-025828 | 2/2012 |
| WO | WO 2005/087680 A1 | 9/2005 |
| WO | WO 2008/101845 A1 | 8/2008 |

* cited by examiner

COMPOSITE TUNGSTEN OXIDE PARTICLE DISPERSION POLYCARBONATE RESIN COMPOSITION AND HEAT-RAY SHIELDING SINTERED COMPACT AND HEAT-RAY SHIELDING LAMINATE USING THE COMPOSITION

TECHNICAL FIELD

The present invention relates to a composite tungsten oxide particle dispersion polycarbonate resin composition and a heat-ray shielding sintered compact and a heat-ray shielding laminate using the composition, and more specifically to the composite tungsten oxide particle dispersion polycarbonate resin composition generally used for roof materials and wall materials of buildings, and window materials, etc., of vehicles, etc., capable of improving a loss of a heat-ray shielding function, and a heat-ray shielding sintered compact, and a heat-ray shielding laminate using the composition.

DESCRIPTION OF RELATED ART

Sunlight incident from windows, namely so-called openings provided in roof materials, wall materials, automobiles, railway vehicles, aircrafts, vessels, and doors, etc., include UV-rays and infrared-rays other than visible lights. An infrared ray included in the sunlight includes a near-infrared ray called a heat-ray with a wavelength of 800 to 2500 nm, which is a factor of increasing a temperature by entering into a room from the openings. In order to solve such a problem, demand for a sintered compact having a heat-ray shielding function for shielding a heat-ray while sufficiently capturing a visible light and suppressing a temperature increase in a room while maintaining brightness has been rapidly increased in recent years, in the fields of manufacture and construction of window materials of each kind of buildings and vehicles, arcades, ceiling domes, and carports, etc. Meanwhile, there are a plurality of proposals for a sintered compact having a heat-ray shielding function, in response to the demand for the sintered compact having the heat-ray shielding function.

For example, there is a proposal of a heat-ray shielding plate with a heat-ray reflective film bonded to a transparent sintered compact such as a glass, an acrylic plate, and a polycarbonate plate, etc., wherein the heat-ray reflective film is formed by vapor-depositing metal or metal oxide on a transparent resin film (for example, see patent documents 1, 2, and 3). However, such a heat-ray shielding film itself is extremely expensive. Further, a complicated step such as a bonding step, etc., is required for manufacturing the heat-ray shielding plate with the heat-ray reflective film bonded to the transparent sintered compact. Therefore, further higher cost is required for the heat-ray shielding plate. In addition, such a heat-ray shielding plate has a poor adhesion between the transparent sintered compact and the heat-ray reflective film, thus having a defect that separation of the transparent sintered compact and the film occurs due to aging deterioration.

Meanwhile, there, are provided a plurality of heat-ray shielding plates formed by directly vapor-depositing metal or metal oxide on a surface of a transparent sintered compact. However, in manufacturing the heat-ray shielding plate, an apparatus in high-vacuum state and requiring atmosphere control with high precision, is required, thus involving a problem of poor mass productivity and poor versatility.

In addition, for example, there is also a proposal of a heat-ray shielding plate and a film obtained by kneading an organic near-infrared absorbent represented by phthalocyanine compound and an anthraquinone compound, into thermoplastic transparent resin such as polyethylene terephthalate resin, polycarbonate resin, acrylic resin, polyethylene resin, and polystyrene resin, etc., (for example, see patent documents 4 and 5). However, in order to sufficiently give a heat-ray shielding power to the heat-ray shielding plate and the film, a large quantity of near-infrared ray absorbent must be mixed. However, when a large quantity of near-infrared ray absorbent is mixed into the heat-ray shielding plate and the film, there is a problem that a visible light transmission function is reduced. Further, since an organic compound is used as the near-infrared ray absorbent, there is a problem in weather resistance in the use for window materials, etc., of buildings and vehicles which are always directly exposed to sunlight, and such heat-ray shielding plate and film are not necessarily suitable.

Further, for example, there is also a proposal of a heat-ray shielding plate configured to knead inorganic particles such as titanium oxide having a heat-ray shielding function, or mica coated with the titanium oxide, into a transparent resin such as acrylic resin or polycarbonate resin, etc., (for example, see patent documents 6 and 7). However, a large quantity of particles having a heat-ray reflecting function is required to be added to this heat-ray shielding plate, to secure the heat-ray shielding function. As a result, there is a problem that the visible light transmission power is reduced, with an increase of an addition amount of the particles having the heat-ray reflecting function. Nevertheless, if the addition amount of the particles having the heat-ray reflecting function is reduced, the heat-ray shielding function is also reduced although the visible light transmission function is increased. As a result, the problem is that it is difficult to simultaneously satisfy both of the heat-ray shielding function and the visible light transmission function. There is also a problem in terms of physical properties of the transparent resin constituting a sintered compact, and particularly in terms of a reduction of strength such as an impact resistance and toughness.

Under such a technical background, an applicant of the present application proposes a master batch obtained by melt-kneading and dispersing fine hexaboride particles in a heat-ray shielding coating liquid in which the hexaboride particles are contained in each kind of binder as heat-ray shielding components, a heat-ray shielding film obtained by coating each kind of sintered compact with the coating liquid and thereafter curing the sintered compact, and thermoplastic resin (for example, see patent documents 8, 9, and 10).

In order to improve solar shielding properties, the present applicant also discloses a solar shielding laminated structure having a high solar shielding property with a small haze value at a low production cost, by using composite tungsten oxide particles expressed by a general formula $W_yO_z$ (wherein W is tungsten, O is oxygen, satisfying $2.0 < z/y < 3.0$), and/or expressed by a general formula $M_xW_yO_z$ (wherein W is tungsten, O is oxygen, satisfying $0.001 \leq x/y \leq 1$, $2.0 < z/y \leq 3.0$) (for example, see patent document 11).

Further, the present applicant proposes a master batch obtained by melt-kneading and dispersing composite tungsten oxide particles in a thermoplastic resin (for example, see patent document 12).

Patent document 1: Japanese Patent Laid Open Publication No. 1986-277437
Patent document 2: Japanese Patent Laid Open Publication No. 1998-146919
Patent document 3: Japanese Patent Laid Open Publication No. 2001-179887
Patent document 4: Japanese Patent Laid Open Publication No. 1994-256541
Patent document 5: Japanese Patent Laid Open Publication No. 1994-264050
Patent document 6: Japanese Patent Laid Open Publication No. 1990-173060
Patent document 7: Japanese Patent Laid Open Publication No. 1993-78544
Patent document 8: Japanese Patent Laid Open Publication No. 2000-96034
Patent document 9: Japanese Patent Laid Open Publication No. 2000-169765
Patent document 10: Japanese Patent Laid Open Publication No. 2004-59875
Patent document 11: International Publication WO2005/87680A1 Pamphlet
Patent document 12: Japanese Patent Laid Open Publication No. 2008-24902

SUMMARY OF THE INVENTION

Problem to be Solved by the Invention

The abovementioned sintered compact is basically used outdoors due to its properties, and is required to have a high weather resistance. However, after study by inventors of the present invention, it is found that in a case of a long time use outdoors, a part of an optical member (film and resin sheet, etc.) containing the composite tungsten oxide particles has a problem that the heat-ray shielding function is reduced under an influence of heat generated when receiving a solar light, and water and oxygen in the air.

Meanwhile, a polycarbonate resin composition is desired in many cases as a heat-ray shielding sintered compact and a transparent base material for a heat-ray shielding laminate, from a viewpoint of an optical property and a mechanical property.

In order to solve the above-described problem, an object of the present invention is to provide a composite tungsten oxide particle dispersion polycarbonate composition and a heat-ray shielding sintered compact and a heat-ray shielding laminate using the composition, capable of improving a loss of a heat-ray shielding function in a case of a long time use.

Means for Solving the Problem

For the purpose of solving the above-described subject, and after strenuous efforts by the inventors of the present invention, it is found that the above-described subject can be solved by adding a specific amount of metal salt containing a specific metal into the composite tungsten oxide particle dispersion polycarbonate resin composition. The present invention is thus completed.

Namely, in order to solve the above-described problem, a first invention provides a composite tungsten oxide particle dispersion polycarbonate resin composition containing composite tungsten oxide particles expressed by a general formula $M_xW_yO_z$ (wherein M is one or more kinds of elements selected from H, He, alkali metal, alkali earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \leq x/y \leq 1$, $2.2 \leq z/y \leq 3.0$), metal salt, and polycarbonate resin,
wherein the metal salt is a salt of one or more kinds of metal elements selected from Mg, Ni, Zn, In, and Sn.

A second invention provides the composite tungsten oxide particle dispersion polycarbonate resin composition according to the first invention, wherein the metal salt is the salt of one or more kinds of elements selected from carboxylate, carbonyl complex salt, carbonate, phosphate, perchlorate, hypochlorite, chlorite, chlorate, and hydrochloride.

A third invention provides the composite tungsten oxide particle dispersion polycarbonate resin composition according to the first or second invention, wherein an addition amount of the metal salt is 0.1 to 50 pt.wt. based on 100 pt.wt. of the composite tungsten oxide particles.

A fourth invention provides a heat-ray shielding sintered compact, wherein the composite tungsten oxide particle dispersion polycarbonate resin composition of the first to third inventions is diluted, melted, and kneaded by polycarbonate resin or a different kind of thermoplastic resin having compatibility with polycarbonate resin, and molded into a specific shape.

A fifth invention provides a heat-ray shielding laminate, wherein the heat-ray shielding sintered compact of the fourth invention is laminated on other transparent sintered compact.

Advantage of the Invention

A composite tungsten oxide particle dispersion polycarbonate resin composition, and a heat-ray shielding sintered compact, and a heat-ray shielding laminate using the composition can be obtained which are capable of improving a loss of a heat-ray shielding function in a case of a long time use outdoors, while securing an optical property and a mechanical property of polycarbonate resin, by diluting, melting, and kneading a composite tungsten oxide particle dispersion polycarbonate resin composition of the present invention by polycarbonate resin or a different kind of thermoplastic resin having compatibility with polycarbonate resin.

MODE FOR CARRYING OUT THE INVENTION

Detailed explanation is given hereafter for a composite tungsten oxide particle dispersion polycarbonate resin composition, and a heat-ray shielding sintered compact, and a heat-ray shielding laminate using the composition according to the present invention.

1. Composite Tungsten Oxide Particle (Indicated by "(A)" in Some Cases, for the Convenience of Explanation in the Present Invention)

Composite tungsten oxide particle (A) used in the present invention is the composite tungsten oxide particle capable of exhibiting a heat-ray shielding function and expressed by a general formula $M_xW_yO_z$ (wherein M is one or more kinds of elements selected from H, He, alkali metal, alkali earth metal, rare earth elements, Mg, Zr, Cr, Mn, Fe, Ru, Co, Rh, Ir, Ni, Pd, Pt, Cu, Ag, Au, Zn, Cd, Al, Ga, In, Ti, Si, Ge, Sn, Pb, Sb, Sb, B, F, P, S, Se, Br, Te, Ti, Nb, V, Mo, Ta, Re, Be, Hf, Os, Bi, and I, wherein W is tungsten, O is oxygen, satisfying $0.001 \leq x/y \leq 1$, $2.2 \leq z/y \leq 3.0$), metal salt, and polycarbonate resin.

The composite tungsten oxide particle (A) expressed by the general formula $M_xW_yO_z$ has an excellent durability when having a crystal structure of a hexagonal crystal system, a tetragonal crystal system, and a cubic crystal system, and therefore preferably has one or more crystal structures selected from the hexagonal crystal system, the tetragonal crystal system, and the cubic crystal system. For example, in a case of the composite tungsten oxide particle (A) having the crystal structure of the hexagonal crystal system, the composite tungsten oxide particle containing one or more kinds of elements selected from Cs, Rb, K, Tl, In, Ba, Li, Ca, Sr, Fe, and Sn, can be given as preferable element M.

At this time, as addition amount x added to element M is preferably 0.001 or more and 1.1 or less, and more preferably in the vicinity of 0.33 as a value of x/y. This is because the value of x/y theoretically calculated from the crystal structure of the hexagonal crystal system is 0.33, and a preferable optical property can be obtained by an addition amount of around 0.33. Meanwhile, presence amount z of oxygen is preferably 2.2 or more and 3.0 or less as a value of z/y. As a typical example, $Cs_{0.33}WO_3$, $Rb_{0.33}WO_3$, $K_{0.33}WO_3$, and $Ba_{0.33}WO_3$, etc., can be given. However, a useful near-infrared ray absorption property can be obtained if x, y, z fall within the abovementioned range.

If reduction of light scattering by particles is focused, a dispersion particle size of the composite tungsten oxide particle is set to 200 nm or less and preferably set to 100 nm or less. This is because if the dispersion particle size of a dispersed particle is small, light scattering by geometric scattering or Mie scattering is reduced in a visible light region with a wavelength of 400 nm to 780 nm. As a result of reducing the light scattering, it is possible to prevent a situation that the heat-ray shielding film is turned into a frosty glass and a sharp transparency cannot be obtained. Namely, when the dispersion particle size of the dispersed particle is 200 nm or less, the abovementioned geometric scattering or Mie scattering is reduced, thus forming a Rayleigh scattering area. Also this is because scattering is reduced with a reduction of the dispersion particle size and transparency is improved, because a scattered light is reduced in inverse proportion to sixth power of the particle size in the Rayleigh scattering area. Further, if the dispersion particle size is 100 nm or less, the scattered light is extremely reduced, and this is preferable. The dispersion particle size is preferably small from a viewpoint of preventing the light scattering, and if the dispersion particle size is 1 nm or more, industrial manufacture is easy.

2. Method for Producing the Composite Tungsten Oxide Particle (A) of the Present Invention The composite tungsten oxide particle (A) of the present invention can be obtained by applying heat treatment to a tungsten compound starting material in an inert gas atmosphere or a reducing gas atmosphere.

The tungsten compound starting material is preferably one or more kind of materials selected from tungsten trioxide powder, tungsten dioxide powder, or a hydrate of tungsten oxide, or tungsten hexachloride, or ammonium tungstate powder, or hydrate powder of tungsten oxide obtained by dissolving tungsten hexachloride in alcohol and thereafter drying the dissolved tungsten hexachloride, or hydrate powder of tungsten oxide obtained by dissolving tungsten hexachloride in alcohol and thereafter adding water thereinto and precipitating the dissolved tungsten hexachloride, or tungsten compound powder and metal tungsten powder obtained by drying ammonium tungstate aqueous solution.

Further, element M (one or more kinds of elements selected from H, He, alkali metal, alkali earth metal, rare earth metal, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I) is added to the tungsten compound starting material in a form of an element simple body or a compound, to thereby obtain a starting material of the composite tungsten compound.

Here, in order to produce the starting material in which each component is uniformly mixed in a molecular level, each raw material is preferably mixed in a form of a solution. Accordingly, the tungsten compound starting material containing element M is preferably the material solvable in a solvent such as water and organic solvent, etc. For example, tungstate containing element M, chloride salt, nitrate, sulfate, oxalate, oxide, carbonate, and hydroxide, etc., can be given. However, the starting material is not limited thereto, and may be a material if it is in a solution state.

As a heat treatment condition in the inert gas atmosphere, temperature is preferably set to 650° C. or more. The starting material subjected to heat treatment at 650° C. or more has a sufficient near-infrared absorption power and has a high efficiency as the heat-ray shielding particle. An inert gas such as Ar and $N_2$, etc., can be used as the inert gas.

Meanwhile, as a heat treatment condition in the reducing gas atmosphere, first, heat treatment is preferably applied to the starting material in the reducing gas atmosphere at temperature of 100° C. or more and 650° C. or less, and subsequently heat treatment is applied thereto in the inert gas atmosphere at temperature of 650° C. or more and 1200° C. or less. The reducing gas in this case is not particularly limited, but $H_2$ is preferable. Then, when $H_2$ is used as the reducing gas, composition of the reducing gas atmosphere is for example preferably the composition in which $H_2$ is mixed in the inert gas such as Ar and $N_2$, etc., by volume ratio of 0.1% or more, and more preferably 0.2% or more. In the reducing gas atmosphere in which $H_2$ is 0.1% or more by volume ratio, reducing can be efficiently advanced.

A raw material powder subjected to heat treatment and reducing process in the reducing gas atmosphere containing $H_2$, includes a Magneli phase and shows an excellent heat-ray shielding property, and can be used as the heat-ray shielding particle in this state. However, by stabilizing hydrogen contained in the tungsten oxide of the raw material powder thus subjected to reducing, weather resistance of the raw material powder which is subjected to reducing process can be improved. Therefore, as described above, the composite tungsten oxide particle (A) which is a stable heat-ray shielding particle can be obtained by applying heat treatment to the raw material powder which is subjected to reducing in the inert atmosphere at the temperature of 650° C. or more and 1200° C. or less. The inert atmosphere during heat treatment is not particularly limited, but $N_2$ and Ar are preferable from an industrial viewpoint.

Surface treatment is applied to the obtained composite tungsten oxide particle (A) by at least one or more kinds of compounds selected from a silane compound, a titanium compound, a zirconia compound, and an aluminum compound, and a surface of the particle is coated with oxide containing one or more kinds of elements of Si, Ti, Zr, and Al, to thereby further improve the weather resistance. This is a preferable structure.

Further, in order to exhibit a desired optical property by the produced heat-ray shielding sintered compact, a powder color of the composite tungsten oxide particle (A) preferably satisfies as follows: L* is 25 to 80, a* is −10 to 10, and b* is −15 to 15 in a powder color based on a L*a*b* color system (JIS Z 8729) recommended by Commission international de l'eclairage (CIE).

3. High Heat-Resistant Dispersant (Indicated by "(B)" in Some Cases in the Present Invention for the Convenience of Explanation.)

Conventionally, a dispersant generally used for the dispersant for coating, is used for the purpose of uniformly dispersing various oxide particles in an organic solvent. However, according to an examination by inventors of the present invention, such a dispersant is not expected to be designed on the assumption that it is used at a high temperature of 200° C. or more. Specifically, in this embodiment, when a conventional dispersant is used for melting and kneading the heat-ray shielding particle and the thermoplastic resin, there is a problem that a functional group in this dispersant is decomposed by heat, and a dispersion power is reduced and discoloring occurs from yellow to brown.

Meanwhile, in the present invention, a dispersant having a thermal decomposition temperature of 230° C. or more and preferably 250° C. or more measured by TG-DTA is used as the high heat-resistant dispersant (B). As a specific example of the high heat-resistant dispersant (B), a dispersant having an acrylic main chain as a main chain, and having a hydroxyl group or an epoxy group as a functional group, can be given. The dispersant having such a structure has a high heat resistance and this is preferable.

When the thermal decomposition temperature of the dispersant is 230° C. or more, the dispersant is capable of maintaining a dispersion power without being decomposed thermally during molding, and does not allow discoloring to occur from yellow to brown. Therefore, in the produced heat-ray shielding sintered compact, as a result of sufficiently dispersing the heat-ray shielding particles, visible light transmittance is satisfactorily secured, and excellent optical property can be obtained, and coloring to yellow does not occur in this heat-ray shielding sintered compact.

Specifically, when a general kneading setting temperature (290° C.) for polycarbonate is used, to thereby conduct a test of kneading the abovementioned dispersant having the thermal decomposition temperature of 230° C. or more and polycarbonate resin, it is confirmed that a kneaded material shows completely the same outer appearance as a case when only polycarbonate is kneaded, which is colorless and transparent and is not colored at all.

As described above, the high heat-resistant dispersant (B) used in the present invention has the acrylic main chain, and a dispersant having a hydroxyl group or an epoxy group as a functional group is further preferable. This is because these functional groups are adsorbed on the surface of the tungsten oxide particle to thereby prevent cohesion of these tungsten oxide particles, and have an effect of uniformly dispersing the tungsten oxide particles.

Specifically, a dispersant having an epoxy group as a functional group and having an acrylic main chain, and a dispersant having a hydroxyl group as a functional group and having an acrylic main chain, are given as preferable examples.

Since melt-kneading temperature of polycarbonate resin is high, there is a remarkable effect of using the high heat-resistant dispersant (B) having the acrylic main chain, the hydroxyl group, or the epoxy group, and having the thermal decomposition temperature of 250° C. or more.

The weight ratio of the high heat-resistant dispersant (B) and the composite tungsten oxide particle (A) is preferably in a range of 10≥[weight of the high heat-resistant dispersant/(weight of the composite tungsten oxide particle)]≥0.5. This is because if the weight ratio is 0.5 or more, the composite tungsten oxide particle (A) can be sufficiently dispersed, thus not allowing the cohesion of the particles to occur, and a sufficient optical property can be obtained in the heat-ray shielding sintered compact. Also, if the weight ratio is 10 or less, mechanical property (bending strength and surface hardness) of the heat-ray shielding sintered compact is not damaged.

4. Metal Salt (Indicated by "(C)" in Some Cases, for the Convenience of Explanation in the Present Invention)

By adding and kneading metal salt (C) into the abovementioned composite tungsten oxide particle (A), polycarbonate resin, and high heat-resistant dispersant (B), the composite tungsten oxide particle dispersion polycarbonate resin composition of the present invention can be obtained, with reduced aging reduction of the infrared ray shielding property.

The reason why the metal salt (C) contained in the composite tungsten oxide particle dispersion polycarbonate resin composition of the present invention is capable of alleviating the aging reduction of the infrared shielding property by acting on the composite tungsten oxide particle dispersion polycarbonate resin composition, is considered as follows by the inventors of the present invention.

Namely, it is considered as follows: in the composite tungsten oxide particle dispersion polycarbonate resin composition, the metal salt exists near or/and on the surface of the infrared ray shielding material particle which is the composite tungsten oxide particle (A), and by an action of this metal salt, moisture entered from the air, etc., is sufficiently taken-in, and radical generated by UV-ray, etc., is sufficiently taken-in, and chain generation of noxious radical is suppressed, and as a result, the aging reduction of the infrared ray shielding property can be alleviated. However, there are many unsolved points regarding the action of the metal salt, and an action other than the abovementioned action may probably works. Therefore the action of the metal salt is not limited to the abovementioned action.

Metal salt (C) used in the present invention is the salt composed of metal selected from Mg, Ni, Zn, In, and Sn, and an inorganic acid or an organic acid, and one or more kinds of them are preferably used.

Specifically, the abovementioned metal salt is preferably selected from carboxylate, carbonyl complex salt, carbonate, phosphate, perchlorate, hypochlorite, chlorate, and hydrochloride.

Then, as the carboxylic acid constituting the abovementioned carboxylate, for example, the following acids can be given: formic acid, acetic acid, propionic acid, butyric acid, valeric acid, caproic acid, octylic acid, naphthenic acid, enanthic acid, carpylic acid, pelargonic acid, capric acid, lauric acid, myristic acid, pentadecanoic acid, palmitic acid, margaric acid, stearic acid, oleic acid, linoleic acid, linolenic acid, arachidonic acid, docosahexaenoic acid, eicosapenta acid, oxalic acid, malonic acid, succinic acid, benzoic acid, phthalic acid, isophthalic acid, terephthalic acid, salicylic acid, gallic acid, mellitic acid, cinnamic acid, pyruvic acid, lactic acid, malic acid, citric acid, maleic acid, aconitric acid, glutaric acid, adipic acid, and amino acid. Further, as β-diketone constituting the carbonyl complex salt, acetylacetone, benzoylacetone, benzoyltrifluoroacetone, hexafluoroacetylacetone, 2-thenoyltrifluoroacetone, etc., can be given.

Further, content of the metal salt (C) in the composite tungsten oxide particle dispersion polycarbonate resin composition, is preferably 0.1 to 50 pt.wt. based on 100 pt.wt. of the infrared ray shielding material particle which is the composite tungsten oxide particle (A).

When the abovementioned content is 0.1 pt.wt. or more, moisture entered from the air, etc., can be sufficiently taken-in, and the radical generated by UV-ray, etc., can be sufficiently taken-in, and therefore chain generation of the noxious radical can be suppressed, and the effect of alleviating the aging reduction of the infrared ray shielding property can be sufficiently obtained. Meanwhile, when the abovementioned content is 50 pt.wt. or less, dispersability of the composite tungsten oxide particle (A) in the heat-ray shielding sintered compact obtained using the composite tungsten oxide particle dispersion polycarbonate resin composition can be secured, thus not causing a deterioration of haze to occur.

Accordingly, the content of the metal salt (C) in the composite tungsten oxide particle dispersion polycarbonate resin composition is preferably 0.1 or more and 50 pt.wt. or less based on 100 pt.wt. of the infrared ray shielding material particle which is the composite tungsten oxide particle (A).

5. Polycarbonate Resin Molding Material (D) (Indicated by "(D)" in Some Cases, for the Convenience of Explanation in the Present Invention)

Polycarbonate resin molding material (D) used in the present invention is not particularly limited, if it is the polycarbonate resin used in this field.

A particularly preferable polycarbonate resin in the present invention is polycarbonate. The polycarbonate is synthesized using one or more kinds of divalent phenolic compounds represented by 2,2-bis(4-hydroxyphenyl)propane, 2,2-bis(3,5-dibromo-4-hydroxyphenyl)propane, and a carbonate precursor represented by phosgene or diphenyl carbonate, etc. A publicly-known method such as interfacial polymerization, melt polymerization, and solid phase polymerization, etc., can be used as a synthesizing method.

Here, as the divalent phenol compounds, for example, bis(hydroxyaryl)alkanes such as bis(4-hydroxyphenyl)methane, 1,1-bis(4-hydroxyphenyl)ethane, 2,2-bis(4-hydroxyphenyl)propane, 2,2 bis(4-hydroxyphenyl)butane, 2,2-bis(4-hydroxyphenyl)octane, bis(4-hydroxyphenyl)phenyl methane, 2,2-bis(4-hydroxy-3-methylphenyl)propane, 2,2 bis(4-hydroxy-3,5-dimethylphenyl)propane, 1,1-bis(4-hydroxy-t-butylphenyl)propane, 2,2-bis(4-hydroxy-3-bromophenyl)propane, 2,2-bis(4-hydroxy-3,5-dibromophenyl)propane; bis(hydroxyaryl)cycloalkanes such as 1,1-bis(4-hydroxyphenyl)cyclopentane, 1,1-(4-hydroxyphenyl)cyclohexane; dihydroxyarylethers such as 4,4'-dihydroxydiphenylether and bis(4-hydroxy-3-methylphenyl)ether; dihydroxyarylsulfides such as 4,4'-dihydroxydipheylsulfide and bis(4-hydroxy-3-methylphenyl)sulfide; dihydroxydiarylsulfides such as 4,4'-dihydroxydiphenylsulfoxide and bis(4-hydroxy-3-methylphenyl)sulfoxide; dihydroxydiaryl sulfones such as 4,4'-dihydroxydiphenylsulfone and bis(4-hydroxy-3-methylphenyl)sulfone; and 4,4-biphenyl, etc.

In addition, resorcin, and substituted resorcin such as 3-methylresorcin, 3-ethylresorcin, 3-propylresorcin, 3-butylresorcin, 3-t-butylresorcin, 3-phenylresorcin, 3-cumylresorcin, 2,3,4,6-tetrafuluororesorcin, and 2,3,4,6-tetrabromresorcin; catechol; hydroquinone, and substituted hydroquinones such as 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,3,5,6-tetramethylhydroquinone, 2,3,5,6-tetra-t-butylhydroquinone, 2,3,5,6-tetrafuluorohydroquione, 2,3,5,6-tetraburomhydroquinone; and 2,2,2'.2'-tetrahydro-3,3,3',3'-tetramethyl-1,1'-spirobis(1H-indene)-7,7' diol, etc., can be used. These bivalent phenol compounds may be used alone or may be used by combining two kinds or more of them.

Carbonate precursor represented by phosgene or diphenylcarbonate, etc., reacted with the bivalent phenol compound is not particularly limited, and for example, ditolyl carbonate, bis(chlorophenyl)carbonate, m-cresylcarbonate, dinaphthylcarbonate, bis(diphenyl)carbonate, diethylcarbonate, dimethylcarbonate, dibutylcarbonate, dicyclohexylcarbonate, etc., can be given. However, the carbonate precursor is not limited thereto. Preferably, diphenylcarbonate is used. These carbonate precursors may also be used alone or may be used by combining two or more kinds of them.

When polycarbonate is produced, dicarboxylic acid or dicarboxylic acid ester may be contained as an acid component. As examples of the dicarboxylic acid and the dicarboxylate, aromatic hydroxycarbosylic acids such as terephthalic acid, isophthalic acid, terephthalic acid diphenyl, and isophthalic acid diphenyl; aliphatic dicarbosylic acids such as succinic acid, glutaric acid, adipic acid, pimelic acid, suberic acid, azelaic acid, sebcic acid, decanedioic acid, dodecanedioic acid, sebacic acid diphenyl, decanedioic acid diphenyl, dodecanedioic acid diphenyl; and alicyclic dicarboxylic acids such as cyclopropanedicarboxylic acid, 1,2-cyclobutanedicarboxylic acid, 1,3-cyclobutandicarboxylic acid, 1,2'-cyclopentandicarboxylic acid, 1,3-cyclopentancarboxylic acid, 1,2-cyclohexanedicarboxylic acid, 1,3-cyclohexanedicarboxylic acid, 1,4-cyclohexanedicarboxylic acid, cyclopropanedicarboxylic diphenyl, 1,2-cyclobutanedicarboxylic diphenyl, 1,3-cyclobutanedicarboxylic diphenyl, 1,2-cyclopentanedicarboxylic diphenyl, 1,3-cyclopentandicarboxylic diphenyl, 1,2-cyclohexanedicarboxylic diphenyl, 1,4-cyclohexanedicarboxylic diphenyl, can be given.

These dicarboxylic acids or dicarboxylic ester may be used alone or two or more kinds of them may be combined. Preferably 50 mol % or less and further preferably 30 mol % or less of dicarboxylic acid or dicarboxylic ester is contained in the abovementioned carbonate precursor.

When polycarbonate is produced, polyfunctional compounds having three or more functional groups in one molecule can be used. A compound having phenolic hydroxyl group or carboxyl is preferable as these polyfunctional compounds, and particularly a compound containing three phenolic hydroxyl groups is preferable.

6. Method for Dispersing the Composite Tungsten Oxide Particle in Polycarbonate Resin The composite tungsten oxide particle (A), the high heat-resistant dispersant (B), and the metal salt (C) are dispersed in the polycarbonate resin molding material (D), to thereby obtain the composite tungsten oxide particle dispersion polycarbonate resin composition.

The method for dispersing the composite tungsten oxide particle (A), the high heat-resistant dispersant (B), and the metal salt (C) in the polycarbonate resin can be arbitrarily selected if this is the method capable of uniformly dispersing particles such as composite tungsten oxide particle (A) in the polycarbonate resin molding material (D).

As a specific example, first, dispersion liquid is adjusted in which the composite tungsten oxide particle (A) is dispersed in an arbitrary solvent, using a method such as a beads mill, a ball mill, a sand mill, and ultrasonic dispersion, etc. Next, the dispersion liquid, the high heat-resistant dispersant (B), and the metal salt (C), a granular material or pellet of the polycarbonate resin molding material (D), and other additive agent as needed, are uniformly melted and mixed while removing the solvent from the dispersion liquid, using a mixing machine such as a ribbon blender, a tumbler, a Nauta-mixer, a Henschel mixer, a super mixer, a planetary mixer, etc., and a kneading machine such as a Banbury mixer, a kneader, a roll, a kneader ruder, a single screw extruder, a twin screw extruder, etc., to thereby adjust a mixture in which the composite tungsten oxide particle (A) is uniformly dispersed in the polycarbonate resin molding material (D). The temperature during kneading is maintained to a temperature of not allowing the polycarbonate resin to be decomposed.

Further, as other method, there is also a method for obtaining the mixture in which the composite tungsten oxide particle (A) is uniformly dispersed in the polycarbonate resin molding material (D) by adding the high heat-resistant dispersant (B) into the dispersion liquid of the composite tungsten oxide particle (A), removing the solvent by a publicly-known method, and uniformly melting and mixing the obtained powder and the granular material or pellet of the carbonate resin, metal salt (C), and other additive agent as needed.

In addition, it is also possible to use a method for uniformly melting and mixing the powder of the composite tungsten oxide particle (A) which is not subjected to dispersion processing yet, the high heat-resistant dispersant (B), and the metal salt (C), by directly adding them into the polycarbonate resin molding material (D). Further, there is also a method for mixing the composite tungsten oxide particle (A), the high heat-resistant dispersant (B) which is other additive agent, and the metal salt (C) in a middle of the polymerization reaction of the polycarbonate resin molding material (D) or at the end of the polymerization reaction of the polycarbonate resin molding material (D), and a method for mixing the composite tungsten oxide particle (A), the high heat-resistant dispersant (B) which is other additive agent, and the metal salt (C) in a melt state of the polycarbonate resin molding material (D) in the middle of kneading, etc., and a method for melting and kneading the composite tungsten oxide particle (A), the high heat-resistant dispersant (B) which is other additive agent, and the metal salt (C) into a solid state of the polycarbonate resin molding material (D) such as a pellet, etc., and thereafter melting and kneading them by an extruder, etc.

The dispersion method is not limited to the above methods, if the composite tungsten oxide particle (A), etc., is uniformly dispersed in the polycarbonate resin molding material (D).

7. Heat-Ray Shielding Sintered Compact

The heat-ray shielding sintered compact of the present invention is the sintered compact formed by diluting/melting and kneading the resin composition including the abovementioned composite tungsten oxide particle dispersion polycarbonate resin composition by the polycarbonate resin molding material (D) or a different kind of thermoplastic resin, which is then molded into a specific shape.

As such a molding method, methods such as injection molding, extrusion molding, compression molding, or rotation molding, etc., can be used. Particularly, when the injection molding and the extrusion molding are used, a desired shape can be efficiently molded and this is preferable. In a plate shape (sheet state) and a film state, a method for drawing-out melted acrylic resin which is extruded using an extruder such as a T-die while cooling the resin by a cooling roll, is employed as a method for obtaining the heat-ray shielding sintered compact by the extrusion molding.

Although a molding temperature is different depending on the composition, etc., of the used polycarbonate resin molding material, it is set to a temperature of a melting point of resin or a higher temperature than a glass transition temperature by 50 to 150° C., so as to obtain a sufficient flowability. For example, the molding temperature is preferably set to 200° C. or more, and preferably 240° C. to 330° C. If the molding temperature is 200° C. or more, viscosity specific to polymers can be reduced, which is preferable because a surface coating composite tungsten oxide particles can be uniformly dispersed in the polycarbonate resin. If the molding temperature is 350° C. or less, deterioration due to decomposition of the polycarbonate resin can be prevented.

8. Heat-Ray Shielding Laminate

The heat-ray shielding laminate of the present invention is the laminate formed by laminating the abovementioned heat-ray shielding sintered compact on a transparent sintered compact. The heat-ray shielding laminate itself can be used for roof materials, wall materials of buildings and window materials used for openings of vehicles, trains, and aircrafts, etc., arcades, ceiling domes, and carports, etc.

Further, the heat-ray shielding sintered compact of the present invention can be used for a construction material by being laminated on other transparent sintered compact such as an inorganic glass, a resin glass, and a resin film, etc., as a heat-ray shielding laminate which is transparent to an integrated visible light. For example, the heat-ray shielding sintered compact previously molded into a film state, is integrally laminated on the inorganic glass by a heat laminate method, to thereby obtain the heat-ray shielding laminate transparent to the visible light having a heat-ray shielding function and a splash preventing function.

Further, by integrally laminating the heat-ray shielding sintered compact on other transparent sintered compact simultaneously with molding the heat-ray shielding sintered compact by the heat laminate method, a co-extrusion method, a press molding method, and an extrusion molding method, etc., the heat-ray shielding laminate which is transparent to the visible light can be obtained. The heat-ray shielding laminate which is transparent to the visible light, can be used as a more useful construction material by complementing mutual defects while effectively exhibiting advantages of mutual sintered compacts.

EXAMPLES

The present invention will be described hereafter in detail, with reference to examples. However, the present invention is not limited to the following examples.

[Raw Material]
(1) Composite tungsten oxide particle: $Cs_{0.33}WO_3$ particle dispersion
(2) Polycarbonate resin molding material: polycarbonate resin pellet (by Sabic Inco, product name: Lexan ML9103R-112)

[Evaluation Method]
Further, regarding an evaluation of the optical property of the heat-ray shielding sintered compact obtained in this example, visible light transmittance VLT (unit: %) and solar transmittance ST (unit: %) were measured using a spectrophotometer U-4100 (by Hitachi, Ltd.). Further, haze (H) (unit: %) was measured based on JIS K 7136, using a haze meter (by Murakami Color Research Laboratory Co., Ltd.).

Adjustment/Evaluation

Example 1

$H_2WO_4$: 50 g and CsOH: 17.0 g (corresponding to Cs/W=0.3) were weighed, which were then sufficiently mixed by an Agate mortar. The obtained mixed powder was heated in an atmosphere of supplying 5% $H_2$ gas using $N_2$ gas as a carrier, and subjected to a reduction treatment for 1 hour at a temperature of 600° C., and thereafter heated for 30 minutes at a temperature of 800° C. in an atmosphere of supplying $N_2$ gas so as to be sintered, to thereby obtain a particle (composition formula is $Cs_{0.33}WO_3$, powder color is L*: 35.2745, a*: 1.4918, and b*: −5.3118).

5 wt % of the obtained particle, and 5 wt % of high heat-resistant dispersant having an acrylic main chain as a main chain and an epoxy group as a functional group, having a thermal decomposition temperature of 255° C., having a molecular weight of about 20000, and 90 wt % of toluene were weighed, which were then put in a paint shaker containing 0.3 mmφ $ZrO_2$ beads, and subjected to pulverization and dispersion treatment for 6 hours, to thereby adjust the composite tungsten oxide particle dispersion liquid of example 1.

Wherein, a dispersion particle size of the tungsten oxide particle in the composite tungsten oxide particle dispersion liquid of example 1 was measured, and it was found that it was 75 nm.

Further, high heat-resistant dispersant having the acrylic main chain as the main chain, having the epoxy group as the functional group, and having the thermal decomposition temperature of 255° C. and a molecular weight of about 20000, was added into the composite tungsten oxide particle dispersion liquid of example 1, and adjusted so that a value of a weight ratio [high heat-resistant dispersant/composite tungsten oxide particle] of the high heat-resistant dispersant and the composite tungsten oxide particle was 4. Then, toluene was removed using a vacuum drier, to thereby obtain a composite tungsten oxide particle dispersion powder of example 1.

As shown in table 1, 100 pt.wt. of polycarbonate resin pellet, 0.15 pt.wt. of composite tungsten oxide particle dispersion powder of example 1, and 0.03 pt.wt. of octylic acid Mg were uniformly mixed, which were then melted and kneaded at 290° C. using a twin extruder (by Toyo Seiki Seisakusyo Ltd.), to thereby cut an extruded strand having a diameter of 3 mm, which was then formed into a pellet.

Next, the pellet and a polycarbonate resin pellet were uniformly mixed so that a content of the composite tungsten oxide particles was 0.05 wt %. The mixture was formed into a sheet of 10 cm×5 cm, with a thickness of 2.0 mm, using an injection molding machine, to thereby obtain the heat-ray shielding sintered compact of example 1.

The optical properties (visible light transmittance T (%), solar transmittance ST (%), and haze H (%)) of the obtained heat-ray shielding sintered compact of example 1, were evaluated. An evaluation result is shown in table 1.

Subsequently, the heat-ray shielding sintered compact of example 1 was held in 85° C.×90% RH bath for 7 days, and thereafter the optical properties (visible light transmittance T (%), solar transmittance ST (%), and haze H (%)) were evaluated. The evaluation result is shown in table 1.

Examples 2 to 7

As shown in table 1, an operation similar to example 1 was performed excluding a point that 100 pt.wt. of polycarbonate resin pellet, 0.15 pt.wt. of powder A, and 0.0015 pt.wt. of octylic acid Mg as metal salt, were uniformly mixed, to thereby obtain a heat-ray shielding sintered compact of example 2.

Similarly, an operation similar to example 1 was performed excluding a point that 100 pt.wt. of polycarbonate resin pellet, 0.15 pt.wt. of powder A, and 0.075 pt.wt. of stearin acid Mg as metal salt, were uniformly mixed, to thereby obtain a heat-ray shielding sintered compact of example 3.

Similarly, an operation similar to example 1 was performed excluding a point that 100 pt.wt. of polycarbonate resin pellet, 0.15 pt.wt. of powder A, and 0.03 pt.wt. of octylic acid Ni as metal salt, were uniformly mixed, to thereby obtain a heat-ray shielding sintered compact of example 4.

Similarly, an operation similar to example 1 was performed excluding a point that 100 pt.wt. of polycarbonate resin pellet, 0.15 pt.wt. of powder A, and 0.03 pt.wt. of octylic acid Zn as metal salt, were uniformly mixed, to thereby obtain a heat-ray shielding sintered compact of example 5.

Similarly, an operation similar to example 1 was performed excluding a point that 100 pt.wt. of polycarbonate resin pellet, 0.15 pt.wt. of powder A, and 0.03 pt.wt. of octylic acid In as metal salt, were uniformly mixed, to thereby obtain a heat-ray shielding sintered compact of example 6.

Similarly, an operation similar to example 1 was performed excluding a point that 100 pt.wt. of polycarbonate resin pellet, 0.15 pt.wt. of powder A, and 0.03 pt.wt. of octylic acid Sn as metal salt, were uniformly mixed, to thereby obtain a heat-ray shielding sintered compact of example 7.

The optical properties (visible light transmittance T (%), solar transmittance ST (%), and haze H (%)) of the heat-ray shielding sintered compact of examples 2 to 7 were evaluated. The evaluation result is shown in table 1.

Subsequently, the heat-ray shielding sintered compacts of examples 2 to 7 were held in 85° C.×90% RH bath for 7 days, and thereafter the optical properties (visible light transmittance T (%), solar transmittance ST (%), and haze H (%)) were evaluated. The evaluation result is shown in table 1.

Comparative Examples 1 to 3

As shown in table 1, an operation similar to example 1 was performed excluding a point that 100 pt.wt. of polycarbonate resin pellet, and 0.15 pt.wt. of powder A, were uniformly mixed and the metal salt was not added, to thereby obtain a heat-ray shielding sintered compact of comparative example 1.

Further, an operation similar to example 1 was performed excluding a point that 100 pt.wt. of polycarbonate resin pellet, 0.15 pt.wt. of powder A, and 10.03 pt.wt. of octylic acid A as metal salt were uniformly mixed, to thereby obtain a heat-ray shielding sintered compact of comparative example 2.

Similarly, an operation similar to example 1 was performed excluding a point that 100 pt.wt. of polycarbonate resin pellet, 0.15 pt.wt. of powder A, and 0.03 pt.wt. of octylic acid Mn as metal salt were uniformly mixed, to thereby obtain a heat-ray shielding sintered compact of comparative example 3.

The optical properties (visible light transmittance T (%), solar transmittance ST (%), and haze H (%)) of the heat-ray shielding sintered compact of comparative examples 1 to 3 were evaluated. The evaluation result is shown in table 1.

Subsequently, the heat-ray shielding sintered compacts of comparative examples 1 to 3 were held in 85° C.×90% RH bath for 7 days, and thereafter the optical properties (visible light transmittance T (%), solar transmittance ST (%), and haze H (%)) were evaluated. The evaluation result is shown in table 1.

CONCLUSION (1) In examples 1 to 3, Mg salt is added as metal salt. Therefore, it is confirmed from table 1, that deterioration of the near infrared ray shielding property is suppressed, which is observed by an acceleration test by heating and humidification of holding the heat-ray shielding sintered compact in 85° C.×90% RH bath for 7 days, compared with comparative example 1 in which metal salt is not added. Namely, it is found that the heat-ray shielding sintered compact of examples 1 to 3 is capable of exhibiting excellent aging stability of the infrared ray shielding property, compared with the heat-ray shielding sintered compact of comparative example 1 according to a conventional technique.

(2) Example 4 shows octylic acid Ni as metal salt, example 5 shows octylic acid Zn as metal salt, example 6 shows octylic acid In as metal salt, and example 7 shows octylic acid Sn as metal salt. In examples 4 to 7 in which the metal salt is used, it is also found that excellent aging infrared ray shielding property can be exhibited, compared with the heat-ray shielding sintered compact of comparative example 1 of the conventional technique, as confirmed from table 1.

(3) Comparative example 2 shows octylic acid Al as metal salt, and comparative example 3 shows octylic acid Mn as metal salt. In comparative example 2 in which a metal element is changed to Al, and in comparative example 3 in which a metal element is changed to Mn, effect of suppressing the deterioration of the near infrared ray shielding property observed by the acceleration test by heating and humidification of holding the heat-ray shielding sintered compact in 85° C.×90% RH bath for 7 days, was not confirmed.

INDUSTRIAL APPLICABILITY

The heat-ray shielding sintered compact and the heat-ray shielding laminate obtained using the composite tungsten oxide particle dispersion polycarbonate resin composition of the present invention in which metal salt is added, has unconventional aging stability, and therefore has an industrial applicability to window materials, etc., of each kind of buildings and vehicles.

TABLE 1

| | Constituent of composite tungsten oxide particle dispersion polycarbonate resin composition | | | | Heat-ray shielding sintered compact | | | | | |
|---|---|---|---|---|---|---|---|---|---|---|
| | | | | | | Before 85° C. X 90% RH holding | | | After 85° C. X 90% RH holding | | |
| | Poly-carbonate resin | Composite tungsten oxide | Metal salt | | Composite tungsten oxide content (Mass %) | Optical property | | | Optical property | | |
| | | | | | | Visible light trans-mittance (%) | Solar trans-mittance (%) | Haze (%) | Visible light trans-mittance (%) | Solar trans-mittance (%) | Haze (%) |
| | Addition amount (pt. wt.) | Addition amount (pt. wt.) | Kind | Addition amount (pt. wt.) | | | | | | | |
| Example 1 | 100 | 0.15 | Octylicacid Mg | 0.03 | 0.05 | 71.8 | 36.5 | 1.4 | 72.9 | 38.0 | 1.3 |
| Example 2 | 100 | 0.15 | Octylic acid Mg | 0.0015 | 0.05 | 71.2 | 35.7 | 1.2 | 72.6 | 37.7 | 1.4 |
| Example 3 | 100 | 0.15 | Stearic acid Mg | 0.075 | 0.05 | 70.6 | 35.0 | 1.5 | 71.5 | 36.2 | 1.6 |
| Example 4 | 100 | 0.15 | Octylic acid Ni | 0.03 | 0.05 | 71.5 | 36.1 | 1.3 | 72.7 | 37.8 | 1.4 |
| Example 5 | 100 | 0.15 | Octylic acid Zn | 0.03 | 0.05 | 72.0 | 37.0 | 1.3 | 73.0 | 38.3 | 1.5 |
| Example 6 | 100 | 0.15 | Octylic acid In | 0.03 | 0.05 | 71.0 | 35.9 | 1.2 | 72.2 | 37.4 | 1.4 |
| Example 7 | 100 | 0.15 | Octylic acid Sn | 0.03 | 0.05 | 70.9 | 35.8 | 1.4 | 72.3 | 37.6 | 1.5 |
| Com* example 1 | 100 | 0.15 | — | — | 0.05 | 72.2 | 36.8 | 1.1 | 75.7 | 41.8 | 1.3 |
| Com* example 2 | 100 | 0.15 | Octylic acid Al | 0.03 | 0.05 | 71.4 | 36.3 | 1.3 | 74.7 | 41.4 | 1.5 |
| Com* example 3 | 100 | 0.15 | Octylic acid Mn | 0.03 | 0.05 | 71.9 | 37.5 | 1.5 | 75.1 | 43.6 | 1.7 |

Com* . . . Comparative

The invention claimed is:

1. A composite tungsten oxide particle dispersion polycarbonate resin composition containing composite tungsten oxide particles expressed by a general formula $M_xW_yO_z$ (wherein M is one or more kinds of elements selected from H, alkali metal, alkali earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \leq x/y \leq 1$, $2.2 \leq z/y \leq 3.0$), metal salt, and polycarbonate resin,
   wherein the metal salt is a salt of one or more kinds of metal elements selected from Mg, Ni, Zn, In, and Sn, and
   an addition amount of the metal salt is 0.1 to 50 parts by weight based on 100 parts by weight of the composite tungsten oxide particles.

2. The composite tungsten oxide particle dispersion polycarbonate resin composition according to claim 1, wherein the metal salt is or more kinds of selected from the group consisting of carboxylate, carbonyl complex salt, carbonate, phosphate, perchlorate, hypochlorite, chlorite, chlorate, and hydrochloride.

3. A heat-ray shielding molding, wherein the composite tungsten oxide particle dispersion polycarbonate resin composition of claim 2 is diluted, melted, and kneaded by polycarbonate resin or a different kind of thermoplastic resin having compatibility with polycarbonate resin, and molded into a specific shape.

4. A heat-ray shielding molding, wherein the composite tungsten oxide particle dispersion polycarbonate resin composition of claim 1 is diluted, melted, and kneaded by polycarbonate resin or a different kind of thermoplastic resin having compatibility with polycarbonate resin, and molded into a specific shape.

5. A heat-ray shielding laminate, wherein the heat-ray shielding molding of claim 4 is laminated on other transparent molding.

* * * * *